United States Patent [19]

Mitchell et al.

[11] 4,444,007
[45] Apr. 24, 1984

[54] METHOD FOR COMBINED CYCLE ELECTRICAL POWER GENERATION

[75] Inventors: David S. Mitchell; David R. Sageman, both of San Rafael, Calif.

[73] Assignee: Chevron Research Company, San Francisco, Calif.

[21] Appl. No.: 357,457

[22] Filed: Mar. 12, 1982

[51] Int. Cl.³ .................................................. F02C 3/28
[52] U.S. Cl. .................................. 60/39.02; 60/39.12; 60/39.182
[58] Field of Search ............... 60/39.02, 39.12, 39.182, 60/39.464; 201/12

[56] References Cited

U.S. PATENT DOCUMENTS

| | | | |
|---|---|---|---|
| 3,704,587 | 12/1972 | Krieb et al. | 60/39.12 |
| 3,847,563 | 11/1974 | Archer et al. | 48/77 |
| 3,916,617 | 11/1975 | McKenzie et al. | 60/39.02 |
| 4,058,974 | 11/1977 | Pfenninger | 60/39.12 |
| 4,095,419 | 6/1978 | Pfenninger | 60/39.12 |
| 4,157,245 | 6/1979 | Mitchell et al. | 201/12 |
| 4,193,259 | 3/1980 | Muenger et al. | 60/39.04 |
| 4,199,933 | 4/1980 | Pfenninger | 60/39.12 |
| 4,202,167 | 5/1980 | Suggitt et al. | 60/39.02 |
| 4,212,160 | 7/1980 | Blaskowski | 60/39.12 |

*Primary Examiner*—Louis J. Casaregola
*Attorney, Agent, or Firm*—D. A. Newell; S. R. LaPaglia; E. A. Schaal

[57] ABSTRACT

A method for combined cycle electrical power generation is disclosed wherein electrical power is generated by an electrical generator driven by a gas turbine, which is in turn driven by two gaseous products of a coal gasification process. The first gaseous product is produced with hot char by the reduction of a coal/water slurry by stream in a gasifier. The second gaseous product is produced by oxidation of the hot char in a combustor.

4 Claims, 1 Drawing Figure

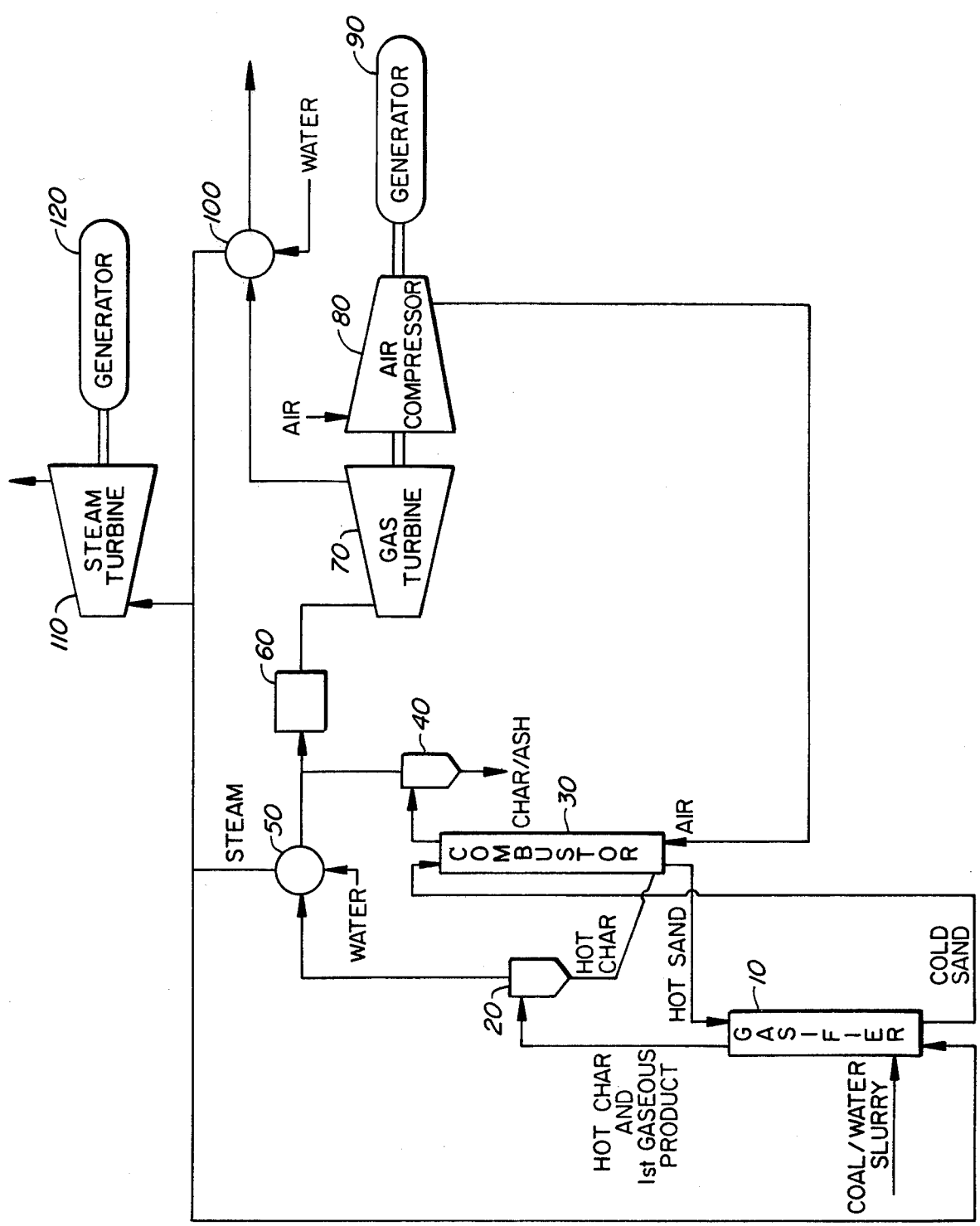

METHOD FOR COMBINED CYCLE ELECTRICAL POWER GENERATION

BACKGROUND OF THE INVENTION

The shortage of low-sulfur crude oils and environmental regulations which restrict the relative amounts of sulfur compounds, oxides of nitrogen, and other contaminants which may be discharged into the atmosphere, severely restrict the availability of fuels which may be used in combustion gas turbine power generation facilities. The shortage of petroleum products in various parts of the world, including the United States, has resulted in governmental regulations to conserve the dwindling supplies of natural gas which might otherwise be available as fuel for gas turbines. As a result, a number of industrial combustion gas turbine powered electrical generation facilities face the prospect of conversion to other fuels or a shutting down of the gas turbine powered systems. By the process of this invention, combustion gas turbine power generation facilities may be operated with low-grade fuels without serious erosion or corrosion problems.

SUMMARY OF THE INVENTION

In the present invention, electrical power is produced by an electrical generator driven by a gas turbine, which is in turn driven by two gaseous products of a coal gasification process. The first gaseous product is produced in a gasifier by the reaction with steam of a coal/water slurry. Hot char is a by-product of the reaction which produces the first gaseous product. The second gaseous product is produced in a combustor by the oxidation of the hot char.

The first gaseous product is formed by introducing a coal/water slurry into a gasifier and passing stream through the gasifier to react with the coal/water slurry to form a hot char and the first gaseous product. The hot char and the first gaseous product are removed from the gasifier, the hot char is separated from the first gaseous product, and the first gaseous product is fed to the gas turbine to drive it.

The heat necessary for the reaction in the gasifier is supplied by a heat-transfer material. This heat-transfer material is removed from the gasifier and at least a portion of the heat-transfer material is introduced into a combustor. At least a portion of the hot char is also introduced into the combustor. The heat-transfer material is heated to an elevated temperature in the combustor by combusting the hot char with air to form a combusted char and a second gaseous product, and contacting the heat-transfer material with the combusted char. At least a portion of the heat-transfer material is recycled to the gasifier as a source of heat-transfer material.

The combusted char and the second gaseous product are removed from the combustor and the combusted char is separated from the second gaseous product. This second gaseous product is also fed to the gas turbine to drive it.

Preferably, the first gaseous product and the second gaseous product exhausted from the gas turbine are passed to a waste heat boiler which produces a steam that drives a steam turbine, which in turn drives an additional electrical generator to produce electrical power. At least some of the first gaseous product separated from the hot char can be passed to a second waste heat boiler to produce additional steam to drive the steam turbine. Impurities should preferably be removed from the first gaseous product and the second gaseous product prior to these products being fed to the gas turbine. The air supplied to the combustor can be supplied by an air compressor driven by either the gas turbine or the steam turbine.

BRIEF DESCRIPTION OF THE DRAWING

In order to facilitate the understanding of this invention, reference will now be made to the appended drawing of a preferred embodiment of the present invention. The drawing should not be construed as limiting the invention but is exemplary only. The drawing is a process diagram of one embodiment of the present invention.

DESCRIPTION OF THE PREFERRED EMBODIMENTS

In its broadest application, the present invention involves the generation of electrical power by an electrical generator driven by a gas turbine which is driven by two gaseous products of a coal gasification process. The first gaseous product is produced with hot char by the reaction of a coal/water slurry by steam in a gasifier. The second gaseous product is produced by oxidation of the hot char in a combustor.

A preferred embodiment of the present invention is shown in the drawing. Referring to the drawing, a coal/water slurry is introduced into gasifier 10 and steam is passed through the gasifier to react with the slurry, forming a hot char and a first gaseous product. The heat necessary for this reaction is supplied by hot sand which acts as a heat-transfer material. The hot char and the first gaseous product are removed from gasifier 10 and are passed to separator 20 where the hot char is separated from the first gaseous product. The sand is heated by removing the sand from gasifier 10 and introducing at least a portion of the sand into combustor 30, introducing at least a portion of the hot char into combustor 30, and heating the sand to an elevated temperature in combustor 30 by combusting the hot char with air to form a combusted char and a second gaseous product, and contacting the sand with the combusted char. At least a portion of the sand heated in combustor 30 is recycled to gasifier 10 as a source of heat-transfer material. The combusted char and second gaseous product are removed from combustor 30 and the combusted char is separated from the second gaseous product in separator 40. The first gaseous product leaving separator 20 is passed through a waste heat boiler 50 to produce steam. Then the first gaseous product and the second gaseous product are passed through gas clean-up unit 60 to remove impurities from the gaseous products and then the first gaseous product and the second gaseous product are fed to gas turbine 70 to drive the gas turbine 70. The gas turbine 70 in turn drives both air compressor 80 and electrical generator 90. Air compressor 80 supplies air to combustor 30. Electrical generator 90 produces electrical power. The first gaseous product and the second gaseous product are then exhausted from gas turbine 70 and are passed through waste heat boiler 100 to produce additional steam. The steam produced by waste heat boiler 50 and waste heat boiler 100 is used to drive steam turbine 110, which in turn drives electrical generator 120 to produce more electrical power. Part of the steam produced by the two waste heat boilers is also used to supply steam to gasifier 10.

U.S. Pat. No. 4,157,245 discloses a process for coal gasification which can be used in the present invention. U.S. Pat. No. 4,157,245 is hereby incorporated by reference to show how to produce a first gaseous product (called "synthesis gas" in the patent) and a second gaseous product (called "flue gas" in the patent) useful in the present invention.

While the present invention has been described with reference to specific embodiments, this application is intended to cover those changes and substitutions which may be made by those skilled in the art without departing from the spirit and scope of the appended claims.

We claim:

1. A method for combined cycle electrical power generation comprising:

(a) introducing a coal/water slurry into a gasifier;

(b) passing steam through said gasifier to react with said coal/water slurry to form a hot char and a first gaseous product, wherein the heat necessary for said reaction is supplied by a heat-transfer material;

(c) removing the hot char and first gaseous product from the gasifier; separating the hot char from the first gaseous product; and introducing at least a portion of the hot char into a combustor;

(d) removing the heat-transfer material from said gasifier; and introducing at least a portion of the heat-transfer material into the combustor;

(e) heating the heat-transfer material to an elevated temperature in said combustor by combusting the char with air to form a combusted char and a second gaseous product, and contacting the heat-transfer material with the combusted char;

(f) recycling at least a portion of said heat-transfer material to said gasifier as a source of heat-transfer material;

(g) removing the combusted char and the second gaseous product from the combustor and separating the second gaseous product from the combusted char;

(h) feeding said first gaseous product and said second gaseous product to a gas turbine to drive said gas turbine, wherein said gas turbine drives an electrical generator to produce electrical power; and (i) exhausting said first gaseous product and said second gaseous product from said gas turbine, and passing said first gaseous product and said second gaseous product through a waste heat boiler which produces steam which drives a steam turbine, which in turn drives an additional electrical generator to produce electrical power, wherein at least some of the first gaseous product separated from said hot char is passed through a second waste heat boiler which produces additional steam to drive said steam turbine.

2. A method for combined cycle electrical power generation according to claim 1 wherein impurities are removed from said first gaseous product and said second gaseous product prior to these products being fed to said gas turbine.

3. A method for combined cycle electrical power generation according to claim 2 wherein said steam turbine drives an air compressor which supplies air to said combustor.

4. A method for combined cycle electrical power generation according to claim 2 wherein said gas turbine drives an air compressor which supplies air to said combustor.

* * * * *